(12) United States Patent
Lavine et al.

(10) Patent No.: US 12,736,800 B2
(45) Date of Patent: Sep. 15, 2026

(54) COMPACT CLOSED-LOOP BYPASS OPTICAL BEAM SENSING AND CORRECTION

(71) Applicant: Raytheon Company, Tewksbury, MA (US)

(72) Inventors: Jason R. Lavine, McKinney, TX (US); Liam T. Skoyles, Allen, TX (US)

(73) Assignee: Raytheon Company, Arlington, VA (US)

( * ) Notice: Subject to any disclaimer, the term of this patent is extended or adjusted under 35 U.S.C. 154(b) by 277 days.

(21) Appl. No.: 18/441,874

(22) Filed: Feb. 14, 2024

(65) Prior Publication Data

US 2025/0258368 A1 Aug. 14, 2025

(51) Int. Cl.
*G02B 26/08* (2006.01)
*G02B 27/14* (2006.01)
*F41H 13/00* (2006.01)

(52) U.S. Cl.
CPC ......... *G02B 26/0891* (2013.01); *G02B 27/14* (2013.01); *F41H 13/0062* (2013.01)

(58) Field of Classification Search
CPC . G02B 26/0891; G02B 27/14; F41H 13/0062; G01S 7/497; G01S 7/4814
See application file for complete search history.

(56) References Cited

U.S. PATENT DOCUMENTS 4,102,572 A 7/1978 O'Meara
6,809,307 B2 10/2004 Byren et al.
7,041,953 B2 5/2006 Byren
7,236,299 B1 6/2007 Smith
7,626,152 B2 12/2009 King et al.
7,671,337 B1 3/2010 Tidwell
7,898,712 B2 3/2011 Adams et al.
8,218,589 B1 7/2012 Saunders
8,362,410 B2 1/2013 King et al.
8,400,700 B2 3/2013 Adams et al.
(Continued)

FOREIGN PATENT DOCUMENTS

DE 3202432 C2 4/1987
WO 2013009550 A2 1/2013
WO 2020226721 A1 11/2020

OTHER PUBLICATIONS

Wikipedia, "Wedge prism", https://en.wikipedia.org/w/index.php?title=Wedge_prism&oldid=1186218464, Nov. 2023, 3 pages.
(Continued)

*Primary Examiner* — Euncha P Cherry

(57) ABSTRACT

An apparatus includes an optical device configured to spatially separate a first optical beam and a second optical beam. The apparatus also includes a divergence controller configured to adjust a divergence of the second optical beam and a steering controller configured to adjust a steering direction of the second optical beam. The apparatus further includes a far field sensor configured to receive a sample of the second optical beam after adjustment of the divergence and the steering direction of the second optical beam and generate measurements of the sample. In addition, the apparatus includes at least one controller configured to control the divergence controller and the steering controller based on the measurements of the sample.

20 Claims, 4 Drawing Sheets

(56) References Cited

U.S. PATENT DOCUMENTS 8,737,438 B2 5/2014 Das et al.
9,791,555 B2 10/2017 Zhu
10,114,213 B2 10/2018 Hargis et al.
10,257,594 B2 4/2019 Holmes et al.
10,261,389 B2 4/2019 Skirlo et al.
10,539,666 B2 1/2020 Ito et al.
10,989,528 B2 4/2021 Paul et al.
11,125,865 B2 9/2021 Hopper et al.
11,342,721 B1 5/2022 Lavine et al.
11,747,480 B2 9/2023 Goldstein et al.
11,788,822 B2 10/2023 Lavine et al.
11,789,252 B1 10/2023 Hilby et al.
2003/0062468 A1 4/2003 Byren et al.
2003/0174315 A1 9/2003 Byren et al.
2008/0042042 A1 2/2008 King et al.
2010/0282942 A1 11/2010 Mosier et al.
2012/0018614 A1 1/2012 King et al.
2013/0134142 A1* 5/2013 Morikazu ............ B23K 26/073
219/121.75
2016/0103309 A1 4/2016 Suzuki et al.
2017/0160541 A1 6/2017 Carothers et al.
2017/0192094 A1* 7/2017 Marron ................. G01S 7/4812
2017/0234658 A1 8/2017 Segev et al.
2018/0180896 A1 6/2018 Karlsen et al.
2018/0267299 A1 9/2018 Sitter, Jr. et al.
2019/0126537 A1* 5/2019 Saha ..................... B29C 64/135
2020/0141795 A1 5/2020 Lavine
2021/0103056 A1 4/2021 Braunreiter et al.

OTHER PUBLICATIONS

International Search Report and Written Opinion of the International Searching Authority regarding International Patent Application No. PCT/US2020/019242 dated Oct. 9, 2020, 10 pages.

Invitation to Pay Additional Fees regarding International Patent Application No. PCT/US2021/038385 dated Sep. 30, 2021, 16 pages.

European Search Report dated Jul. 3, 2025 in connection with European Patent Application No. 25156825.9, 8 pages.

* cited by examiner

COMPACT CLOSED-LOOP BYPASS OPTICAL BEAM SENSING AND CORRECTION

TECHNICAL FIELD

This disclosure generally relates to optical systems. More specifically, this disclosure relates to compact closed-loop bypass optical beam sensing and correction.

BACKGROUND

Various laser systems and other optical systems may transmit optical beams that are co-boresighted (meaning they are directed at the same location) or that propagate close to one another through space. For example, high-energy laser (HEL) systems can direct HEL beams at incoming missiles, rockets, mortars, or other targets in order to damage or destroy the targets. The HEL systems can also direct target illumination laser (TIL) beams at the targets in order to generate images of the targets and to track the targets over time.

SUMMARY

This disclosure relates to compact closed-loop bypass optical beam sensing and correction.

In a first embodiment, an apparatus includes an optical device configured to spatially separate a first optical beam and a second optical beam. The apparatus also includes a divergence controller configured to adjust a divergence of the second optical beam and a steering controller configured to adjust a steering direction of the second optical beam. The apparatus further includes a far field sensor configured to receive a sample of the second optical beam after adjustment of the divergence and the steering direction of the second optical beam and generate measurements of the sample. In addition, the apparatus includes at least one controller configured to control the divergence controller and the steering controller based on the measurements of the sample.

In a second embodiment, a system includes multiple optical sources configured to generate multiple input optical beams, where the multiple input optical beams include two or more optical beams and an additional optical beam. The system also includes a beam combiner configured to combine the two or more optical beams in order to generate a combined optical beam and an optical device configured to spatially separate the combined optical beam and the additional optical beam. The system further includes a divergence controller configured to adjust a divergence of the additional optical beam and a steering controller configured to adjust a steering direction of the additional optical beam. The system also includes a far field sensor configured to receive a sample of the additional optical beam after adjustment of the divergence and the steering direction of the additional optical beam and generate measurements of the sample. In addition, the system includes at least one controller configured to control the divergence controller and the steering controller based on the measurements of the sample.

In a third embodiment, a method includes generating multiple input optical beams, where the multiple input optical beams include two or more optical beams and an additional optical beam. The method also includes combining the two or more optical beams in order to generate a combined optical beam and spatially separating the combined optical beam and the additional optical beam. The method further includes controlling a divergence of the additional optical beam and controlling a steering direction of the additional optical beam. The method also includes receiving a sample of the additional optical beam after controlling of the divergence and the steering direction of the additional optical beam and generating measurements of the sample. In addition, the method includes adjusting the controlling of the divergence and the controlling of the steering direction of the additional optical beam based on the measurements of the sample.

Other technical features may be readily apparent to one skilled in the art from the following figures, descriptions, and claims.

BRIEF DESCRIPTION OF THE DRAWINGS

For a more complete understanding of this disclosure, reference is made to the following description, taken in conjunction with the accompanying drawings, in which.

DETAILED DESCRIPTION

Figure 1:
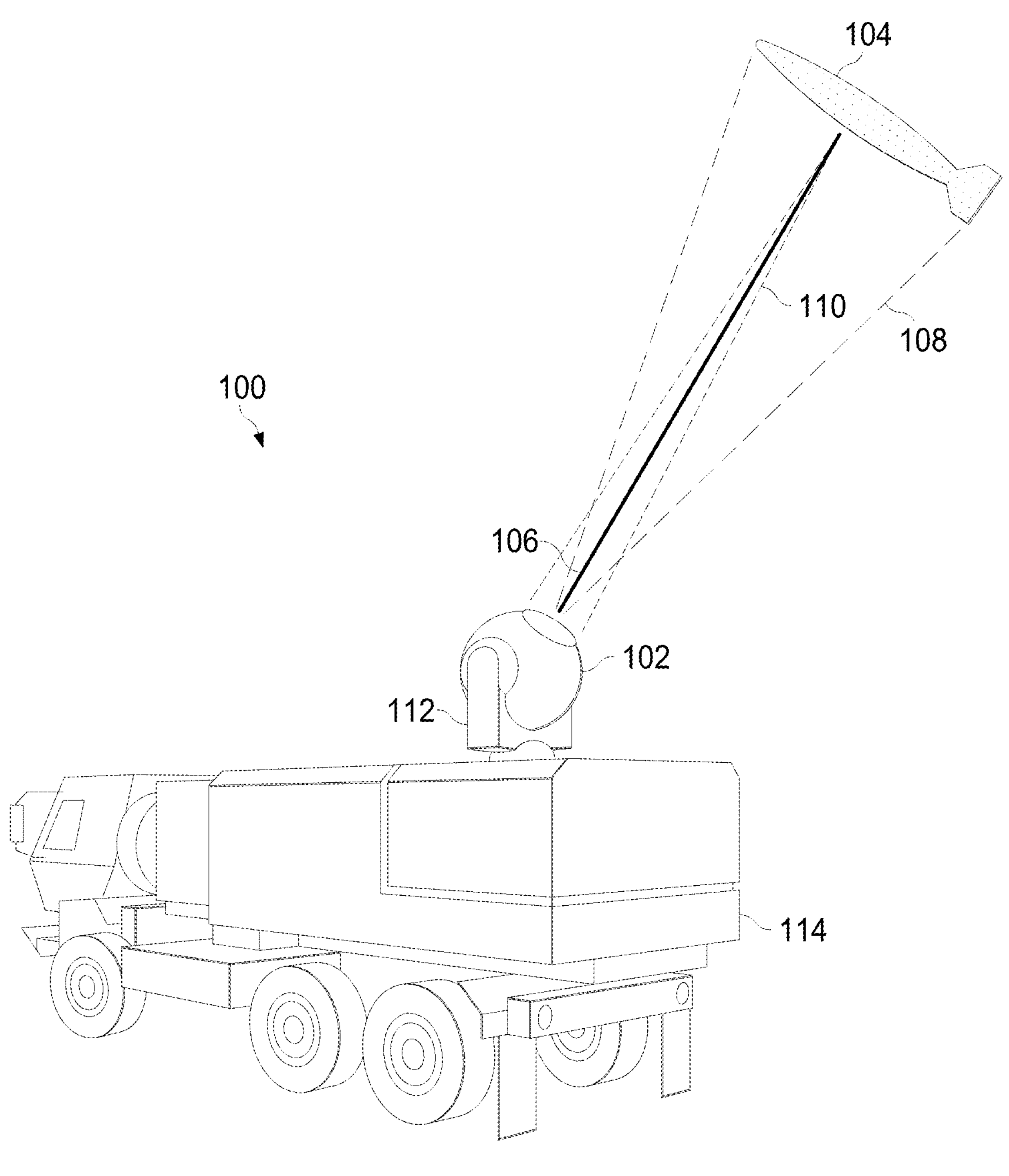
FIG. 1 illustrates an example system supporting compact closed-loop bypass optical beam sensing and correction in accordance with this disclosure.

FIGS. 1 through 4, described below, and the various embodiments used to describe the principles of the present disclosure are by way of illustration only and should not be construed in any way to limit the scope of this disclosure. Those skilled in the art will understand that the principles of the present disclosure may be implemented in any type of suitably arranged device or system.

As noted above, various laser systems and other optical systems may transmit optical beams that are co-boresighted (meaning they are directed at the same location) or that propagate close to one another through space. For example, high-energy laser (HEL) systems can direct HEL beams at incoming missiles, rockets, mortars, or other targets in order to damage or destroy the targets. The HEL systems can also direct target illumination laser (TIL) beams at the targets in order to generate images of the targets and to track the targets over time. It is often necessary or desirable for a TIL beam to remain substantially centered on a target over time (such as while the target moves), particularly when the TIL beam has a Gaussian energy distribution. Such an energy distribution means that a majority of optical energy in the TIL beam is located within a central portion of the TIL beam, so keeping the TIL beam centered on a target can help to improve the overall performance of the optical system. Also, it is often necessary or desirable for the HEL beam to remain substantially directed at a single point on the target over time, which is done in order to achieve the maximum possible effect on the target.

Unfortunately, it is common for beam-to-beam far-field alignment drift to occur, which means that the HEL beam and the TIL beam may move away from each other at or near the target (which is said to be located in the "far field" away from the optical system). This alignment drift may be due to various causes, such as thermal issues, laser performance, laser mode shifting, or operational modes changing. When a TIL beam drifts away from a target, this can result in a loss of target tracking or can result in low-quality target tracking. While some approaches use an HEL beam and a TIL beam that follow a common optical path and remain substantially aligned at all times, this may require the use of different polarizations of optical beams and increase power consumption by the overall optical system.

This disclosure provides various techniques for compact closed-loop bypass optical beam sensing and correction. As described in more detail below, bypass optical beam sensing and correction may be performed using at least one first optical beam that is spatially separated from at least one second optical beam. For instance, bypass optical beam sensing and correction may be performed using a TIL beam that is spatially separated from an HEL beam. Steering control can be provided for the at least one first optical beam, such as by using a pair of refractive Risley wedges or at least one fast or slow reflective steering mirror. Divergence control can also be provided for the at least one first optical beam, such as by using a pair of refractive elements. Closed-loop active control can be used to support both the steering control and the divergence control, and the entire arrangement can be positioned within a compact package. In some cases, a pointing reference can be provided for additional independent control and calibration. Also, in some cases, a laser range-finder can be used with common aperture output integration. In this way, the described techniques provide a combination of physical mechanical, electrical, and optical elements that can be used to implement a solution for closed-loop optical beam pointing and control. Moreover, the overall package can have low size, weight, and power (SWaP) and low electro-mechanical complexity.

Note that the described techniques for compact closed-loop bypass optical beam sensing and correction may be used in any suitable manner and in any suitable application. In the following discussion, it is often assumed that the described techniques for compact closed-loop bypass optical beam sensing and correction are used with optical beams in an HEL system that generates at least one HEL beam and at least one TIL beam. However, the described techniques for compact closed-loop bypass optical beam sensing and correction may be used in any other suitable systems and with any other suitable optical beams. In general, this disclosure is not limited to use in any specific type(s) of system(s) or with any specific type(s) of optical beam(s).

FIG. 1 illustrates an example system 100 supporting compact closed-loop bypass optical beam sensing and correction in accordance with this disclosure. As shown in FIG. 1, the system 100 includes a high-energy laser system 102 that is being used to engage a target 104. The target 104 in this example represents a rocket or missile. However, the high-energy laser system 102 may be used with any other suitable targets, such as one or more targets on the ground, in the air, on the water, or in space. Also, the functionality for compact closed-loop bypass optical beam sensing and correction described below may be used with any other suitable system for aiming or targeting purposes or other purposes.

The laser system 102 in this example generates an HEL beam 106, a TIL beam 108, and optionally a beacon illumination laser (BIL) beam 110. The HEL beam 106 represents a beam of laser energy that typically has a high power or energy level, such as at least about 10 kilo-Watts (kW) of power. Often times, the HEL beam 106 is ideally focused to as small an area as possible on the target 104, which is done in order to achieve the maximum possible effect on the target 104.

The TIL beam 108 represents a beam of laser energy that spreads out to illuminate part or all of the target 104. The TIL beam 108 typically has a much lower power or energy level compared to the HEL beam 106. Reflections of the TIL beam 108 off the target 104 can be received at the laser system 102 and used to capture images of the target 104. The images may be processed to perform super-resolution, automatic target aimpoint recognition, target tracking, or other functions. The images can also be processed to measure, for instance, the distance and angle of the target 104 relative to the laser system 102 or relative to a high-energy laser in the laser system 102. In some embodiments, the TIL beam 108 may represent a continuous wave 1567 nanometer (nm) laser beam, although other suitable longer or shorter wavelengths may be used for the TIL beam 108.

The BIL beam 110 represents a beam of laser energy that may be used to generate a more focused illumination spot or "see spot" on the target 104. In some cases, a particular intended location on the target 104 to be illuminated by the BIL beam 110 may be selected. For example, it may be predetermined to illuminate a particular feature on the nose of the target 104. The BIL beam 110 can be subject to optical turbulence in the atmosphere or other effects that create boresight error for the BIL beam 110. Thus, the actual location of the see spot on the target 104 may vary from the intended or expected location of the see spot, and the difference between the actual and intended/expected locations of the see spot can be used to determine the boresight error. Movement of the BIL beam 110 on the target 104 may be used as a proxy for movement of the HEL beam 106 on the target 104, so adjustments can be made to the HEL beam 106 and the BIL beam 110 to reduce or minimize the movement of the HEL beam 106 and the BIL beam 110 on the target 104. In some embodiments, the BIL beam 110 may represent a 1005 nm laser beam, although other suitable longer or shorter wavelengths may be used for the BIL beam 110. In some cases, the wavelength of the BIL beam 110 can be close to the wavelength of the HEL beam 106.

The BIL beam 110 can be offset (such as in angle) relative to the HEL beam 106 so that the BIL beam 110 and the HEL beam 106 strike the target 104 at different locations. However, both beams 106 and 110 travel from the laser system 102 to the target 104 in very close proximity to one another, and the actual distance between the strike points for the two beams 106 and 110 can be very small. Because of this, compensating for the boresight error associated with the BIL beam 110 may also correct for the same boresight error associated with the HEL beam 106. If the wavelength of the BIL beam 110 is close to the wavelength of the HEL beam 106, the two beams 106 and 110 can experience approximately the same boresight error.

In this particular example, the laser system 102 includes or is used with a multi-axis gimbal 112, which mounts the laser system 102 on a vehicle 114. The multi-axis gimbal 112 includes any suitable structure configured to point the laser system 102 in a desired direction. In some embodiments, the multi-axis gimbal 112 can rotate the laser system 102 about a vertical axis for azimuth control and about a horizontal axis for elevation control. However, any other suitable mechanisms for pointing the laser system 102 (such as about a single axis or multiple axes) may be used here. Also, in this particular example, the vehicle 114 on which the laser system 102 is mounted represents an armored land vehicle. However, the laser system 102 may be used with any other suitable type of vehicle (such as any other suitable land, air, water, or space vehicle), or the laser system 102 may be mounted to a fixed structure (such as a building).

As described in more detail below, the laser system 102 may include a system supporting compact closed-loop bypass optical beam sensing and correction. Among other things, the TIL beam 108 can be spatially separated from the HEL beam 106 within the laser system 102, and sensing and correction may be performed on the TIL beam 108. For example, closed-loop steering control can be provided using a pair of refractive Risley wedges or at least one fast or slow reflective steering mirror. As another example, closed-loop divergence control can be provided using a pair of refractive elements. The entire arrangement of components used for beam sensing and correction can be positioned within a compact package. Among other things, this can help to keep a suitable TIL beam 108 directed at a desired location, such as on the target 104.

Although FIG. 1 illustrates one example of a system 100 supporting compact closed-loop bypass optical beam sensing and correction, various changes may be made to FIG. 1. For example, the laser system 102 may be used in any other suitable environments and for any other suitable purposes. Also, while shown here as being used to damage or destroy a moving hostile target 104, the laser system 102 can be used in any number of other ways depending on the application. Further, as noted above, closed-loop bypass optical beam sensing and correction may be used in other systems that may or may not involve the use of a high-energy laser system 102 or an HEL beam 106, a TIL beam 108, and/or a BIL beam 110.

There are various defense-related and commercial or other non-defense-related applications for high-energy laser systems or other systems that may benefit from the approaches described in this patent document. For instance, in commercial mining applications like drilling, mining, or coring operations, a high-energy laser can be used to soften or weaken an earth bed prior to drilling, which may allow for fewer drill bit changes and extended lifetimes and reliabilities of drill bits. In remote laser welding, cutting, drilling, or heat treating operations like industrial or other automation settings, a high-energy laser can be used to allow for the processing of thicker materials at larger working distances from the laser system while minimizing the heat-affected zone and maintaining vertical or other cut lines. This helps to support welding or cutting operations where proximity to the weld or cut site is difficult or hazardous and helps to protect the laser system and possibly any human operators from smoke, debris, or other harmful materials. In construction and demolition operations like metal resurfacing or deslagging, paint removal, and industrial demolition operations, a high-energy laser can be used to ablate material much faster and safer compared to conventional operations. As a particular example of this functionality, a high-energy laser can be used to support demolition of nuclear reactors or other hazardous structures, such as by cutting through contaminated structures like contaminated concrete or nuclear containment vessels or reactors from long distances. This avoids the use of water jet cutting or other techniques (which creates contaminated water or other hazardous waste) and provides improved safety (since human operators can remain farther away from contaminated structures being demolished). A number of additional applications are possible, such as with a high-energy laser in power beaming applications (where a beam is targeted to photovoltaic cells of remote devices to be recharged) or hazardous material applications (where a beam is used to heat and decompose hazardous materials into less harmful or non-harmful materials).

Figure 2:
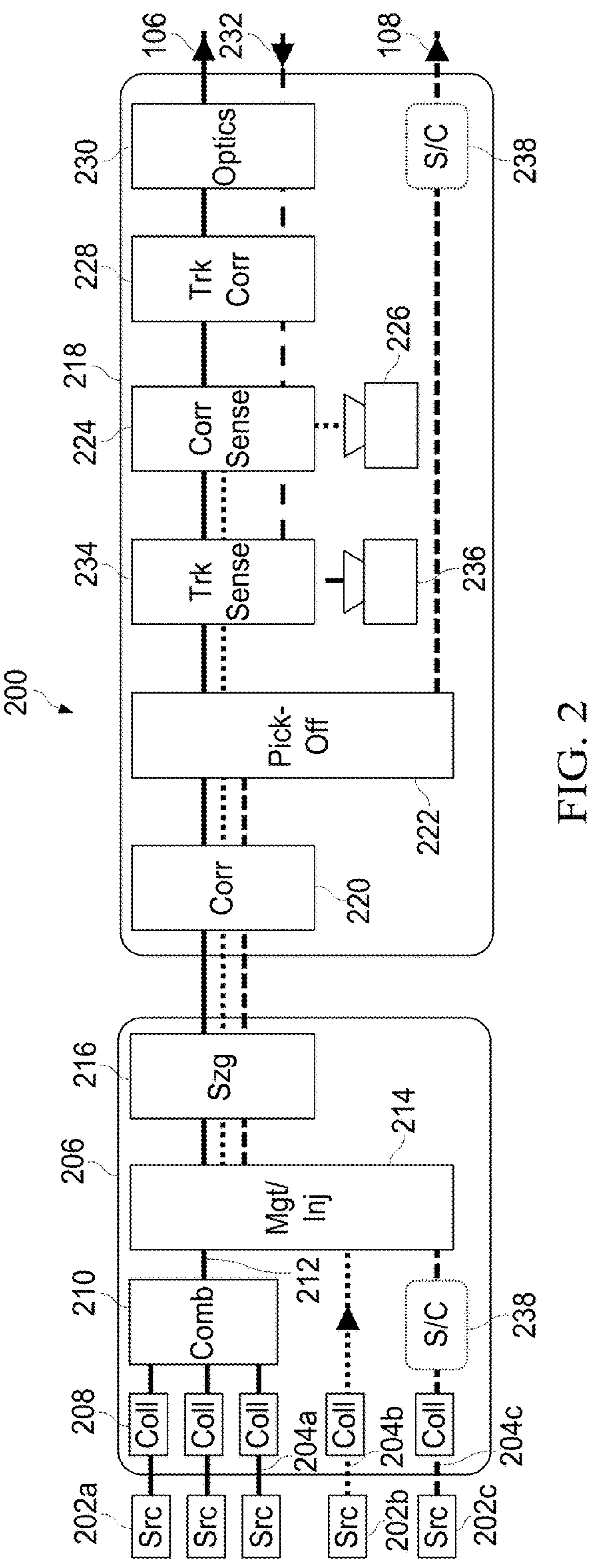
FIG. 2 illustrates an example architecture supporting compact closed-loop bypass optical beam sensing and correction in accordance with this disclosure.

FIG. 2 illustrates an example architecture 200 supporting compact closed-loop bypass optical beam sensing and correction in accordance with this disclosure. For ease of explanation, the architecture 200 shown in FIG. 2 may be described as being used in the system 100 of FIG. 1, such as to perform beam sensing and correction of the TIL beam 108. However, the architecture 200 shown in FIG. 2 may be used in any other suitable environments and for any other suitable purposes.

As shown in FIG. 2, the architecture 200 includes a number of optical sources **202*a*-202*c*, where each optical source 202*a*-202*c* is used to generate an input optical beam 204*a*-204*c*. In this example, there are multiple optical sources 202*a* that are used to generate multiple input optical beam 204*a*, which (as described below) can be combined to produce the HEL beam 106. There is also an optical source 202*b* that is used to generate an input optical beam 204*b*, which can be used as an auto-alignment beam. In addition, there is an optical source 202*c* that is used to generate an input optical beam 204*c*, which (as described below) can be used to produce the TIL beam 108. Each optical source 202*a*-202*c* represents any suitable structure configured to generate an optical beam, such as a continuous wave or pulsed laser source or a laser amplifier. Each input optical beam 204*a*-204*c*** may have any suitable size, shape, dimensions, energy, and energy distribution.

An input beam processing unit 206 of the architecture 200 generally pre-processes the input optical beams **204*a*-204*c* and prepares the input optical beams 204*a*-204*c* for subsequent use. For example, the input beam processing unit 206 can include multiple collimators 208, each of which can be used to collimate one of the input optical beams 204*a*-204*c*. Each collimator 208 includes any suitable structure configured to collimate an optical beam. The collimated input optical beams 204*a* are provided to an optical combiner 210, which combines the collimated input optical beams 204*a* in order to generate a combined optical beam 212. The combined optical beam 212 may represent a high-energy beam that includes the optical energies from the various input optical beams 204*a*. The optical combiner 210** includes any suitable structure configured to combine optical beams.

The combined optical beam 212, the collimated input optical beam **204*b*, and the collimated input optical beam 204*c* are provided to a laser management/system injection block 214, which operates to align the various beams 212, 204*b*, 204*c* so that the beams can follow a common optical path through a portion of the architecture 200. For example, the laser management/system injection block 214 may include one or more mirrors, dichroic mirrors, or other optical devices used to generally align the beams 212, 204*b*, 204*c*. The aligned beams 212, 204*b*, 204*c* are provided to a laser sizing block 216, which can adjust the size(s) of one or more of the aligned beams 212, 204*b*, 204*c*. For instance, the laser sizing block 216 may use one or more lenses or other optical devices to resize one or more of the aligned beams 212, 204*b*, 204*c***.

A beam director unit 218 of the architecture 200 generally operates to condition and direct different beams to desired destinations. For example, the beam director unit 218 can include a beam correction block 220, which can correct for misalignment of some or all of the optical beams 212, **204*b*, 204*c* (as processed using earlier functions). For example, the beam correction block 220 may include one or more fast steering mirrors or other optical devices that can be controlled to correct for at least some misalignment of the optical beams 212, 204*b*, 204*c*. A pick-off unit 222 separates the input optical beam 204*c* (as processed using earlier functions) so that the input optical beam 204***c* is spatially separated from the combined optical beam 212. For instance, the pick-off unit 222 may use one or more mirrors, dichroic mirrors, or other optical devices to spatially separate the input optical beam 204*c* from the combined optical beam 212.

The combined optical beam 212 and the input optical beam 204*b* (as processed using earlier functions) are provided to a beam correction sense block 224, which splits off the input optical beam 204*b* from the combined optical beam 212 and provides the input optical beam 204*b* to a beam correction sensor 226. For example, the beam correction sense block 224 may use one or more mirrors, dichroic mirrors, or other optical devices to separate the input optical beam 204*b* and the combined optical beam 212. The beam correction sensor 226 can use the input optical beam 204*b* to determine how to adjust the path of the combined optical beam 212. For instance, the beam correction sensor 226 may sense the location of the input optical beam 204*b* on a focal plane array or other imaging device. As a particular example, the beam correction sensor 226 may represent a coudé optical position sensor (COPS). In some cases, the beam correction sensor 226 can provide measurements of angular and spatial beam error and may be configured to image optical components of the architecture 200.

A tracking correction block 228 can be used to adjust the path of the combined optical beam 212 based on the measurements captured by the beam correction sensor 226. For example, the tracking correction block 228 may include one or more fast steering mirrors or other optical devices that can adjust the direction of the combined optical beam 212 based on the measurements captured by the beam correction sensor 226. Effectively, this allows the auto-alignment beam (the input optical beam 204*b*) to be used to control the direction of the combined optical beam 212. One or more lenses or other optics 230 can be used to focus or otherwise outcouple the combined optical beam 212 from the architecture 200, such as in the form of the HEL beam 106.

The TIL beam 108 (which is based on the input optical beam 204*c*) produced by the architecture 200 is transmitted, and return illumination 232 represents optical energy from the TIL beam 108 as reflected (such as from a target 104). The return illumination 232 is provided to a tracking sense block 234, which provides the return illumination 232 to a high-speed tracking sensor 236. The tracking sensor 236 can use the return illumination 232, such as to generate images of the target 104 or to identify information about the target 104 (like its distance and angle relative to the architecture 200). In some cases, the tracking sensor 236 may represent a camera or other sensor for target acquisition and tracking. In particular embodiments, the tracking sensor 236 may represent a 30 Hz camera or other imaging device that can detect short-wave infrared (SWIR), near infrared (NIR), or other optical radiation. Output from the tracking sensor 236 may be used in any suitable manner, such as to provide imaging feedback or to position or reposition the HEL beam 106 on the target 104.

Figure 3:
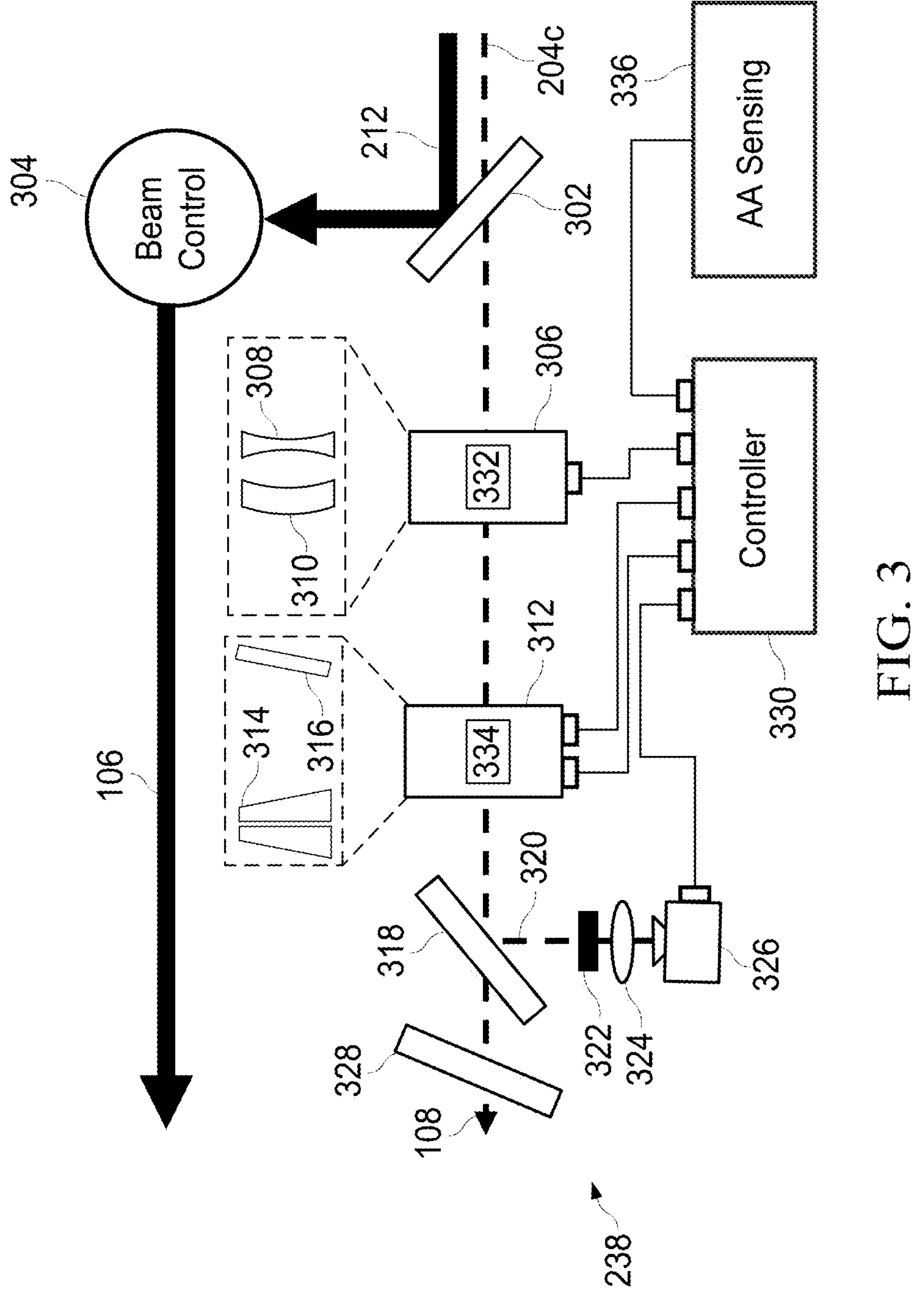
FIGS. 3 and 4 illustrate example devices supporting compact closed-loop bypass optical beam sensing and correction in accordance with this disclosure.
Figure 4:
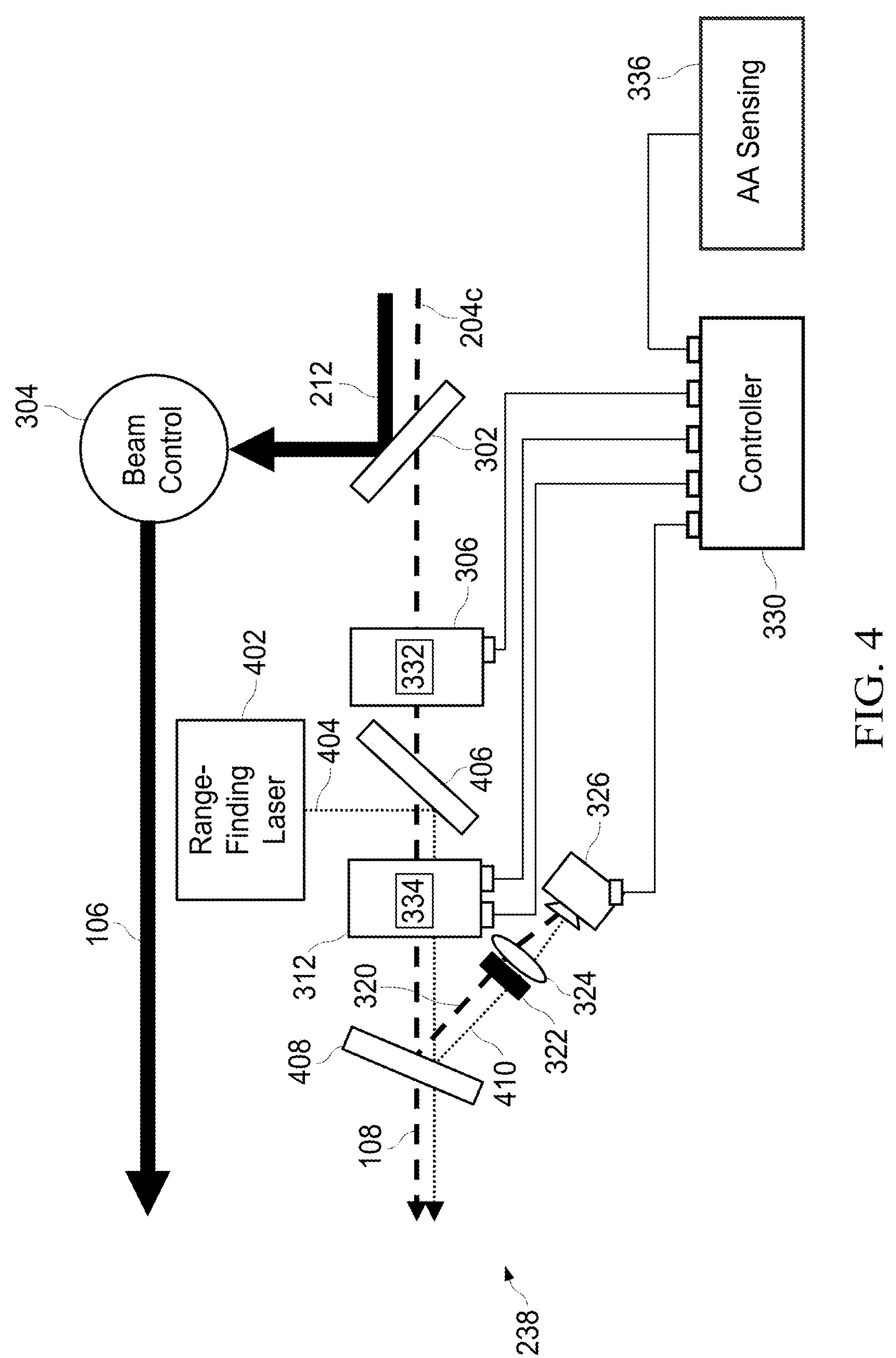

In addition, the architecture 200 includes a bypass optical beam sensing and correction (S/C) unit 238. The sensing and correction unit 238 can capture sensor measurements associated with the input optical beam 204*c* and can modify the input optical beam 204*c* so that the resulting TIL beam 108 is directed in a desired direction and has one or more desired characteristics (such as divergence angle). The sensing and correction unit 238 is described as a "bypass optical beam" sensing and correction unit since the input optical beam 204*c* is spatially separated from the combined optical beam 212, allowing the input optical beam 204*c* to bypass some of the optical modifications performed on the combined optical beam 212. Example implementations of the sensing and correction unit 238 are shown in FIGS. 3 and 4, which are described below. Note that the sensing and correction unit 238 may be positioned at any suitable location within the architecture 200 at which the sensing and correction unit 238 can receive and modify the input optical beam 204*c*. Two example locations are identified in FIG. 2, one within the input beam processing unit 206 and one within the beam director unit 218. However, these locations are for illustration and explanation only.

Although FIG. 2 illustrates one example of an architecture 200 supporting compact closed-loop bypass optical beam sensing and correction, various changes may be made to FIG. 2. For example, components can be added, omitted, combined, further subdivided, replicated, or placed in any other suitable configuration in FIG. 2 according to particular needs.

FIGS. 3 and 4 illustrate example devices supporting compact closed-loop bypass optical beam sensing and correction in accordance with this disclosure. More specifically, FIGS. 3 and 4 illustrate example embodiments of the bypass optical beam sensing and correction unit 238 of FIG. 2. For ease of explanation, the devices shown in FIGS. 3 and 4 may be described as being used in the architecture 200, which can be used in the system 100 of FIG. 1. Also, the devices shown in FIGS. 3 and 4 may be described as being used to receive and modify a TIL beam 108 that is spatially separated from an HEL beam 106. However, the devices shown in FIGS. 3 and 4 may be used in any other suitable architectures or systems and for any other suitable purposes, and the devices shown in FIGS. 3 and 4 may be used with any other suitable types of optical beams.

As shown in FIG. 3, a beamsplitter 302 is used to separate the combined optical beam 212 and the input optical beam 204*c* (as processed using earlier functions). Here, the beamsplitter 302 is used to reflect the combined optical beam 212 and transmit the input optical beam 204*c*, although the opposite approach may be used. In some embodiments, the reflection or transmission can be based on the wavelengths of optical signals, such as when the beamsplitter 302 is reflective at the wavelength(s) of the combined optical beam 212 and transmissive at the wavelength(s) of the input optical beam 204*c* (or vice versa). The beamsplitter 302 includes any suitable structure configured to reflect and transmit electromagnetic energy. In some cases, the beamsplitter 302 may form at least part of the pick-off unit 222 described above. Also, note that the beamsplitter 302 may be replaced by another optical device, such as a mirror that can reflect the combined optical beam 212 without interacting with the input optical beam 204*c*. The combined optical beam 212 is modified using one or more beam control components 304. In some cases, the one or more beam control components 304 may represent the beam correction sense block 224, the tracking correction block 228, and the optics 230 described above.

The bypass optical beam sensing and correction unit 238 receives the input optical beam 204*c*, which is bypassing the beam control components 304. The bypass optical beam sensing and correction unit 238 here includes a divergence controller 306, which can be used to control the divergence of the input optical beam 204*c*. The divergence of the input optical beam 204*c* relates to the increase in beam diameter or radius as distance from the bypass optical beam sensing and correction unit 238 increases. The divergence controller 306 can use any suitable technique to control the divergence of the input optical beam 204*c*. In some embodiments, for example, the divergence controller 306 includes a pair of refractive lenses 308 and 310 used to control the divergence of the input optical beam 204*c*. In these embodiments, the distance between the two lenses 308 and 310 may be varied to adjust the divergence of the input optical beam 204*c*. In this particular example, the lens 308 represents a concave-concave lens, and the lens 310 represents a concave-convex lens. Note, however, that any other suitable technique may be used by the divergence controller 306 to control the divergence of the input optical beam 204*c*.

The bypass optical beam sensing and correction unit 238 also includes a steering controller 312, which control the steering of the input optical beam 204*c*. This means that the steering controller 312 controls the direction in which the input optical beam 204*c* travels away from the bypass optical beam sensing and correction unit 238. The steering controller 312 can use any suitable technique to control the steering of the input optical beam 204*c*. In some embodiments, for example, the steering controller 312 includes a pair of Risley wedges 314, at least one of which can be rotated to change the direction of the input optical beam 204*c*. In other embodiments, the steering controller 312 includes at least one steering mirror 316, such as a fast or slow steering mirror. Note, however, that any other suitable technique may be used by the steering controller 312 to control the steering of the input optical beam 204*c*.

Another beamsplitter 318 receives the input optical beam 204*c* as modified by the divergence controller 306 and the steering controller 312. The beamsplitter 318 allows the bulk of the input optical beam 204*c* to be transmitted through the beamsplitter 318 while reflecting a sample 320 of the input optical beam 204*c* (although the opposite may also occur). The sample 320 passes through a filter 322, such as a neutral density filter, which can reduce the intensity of the input optical beam 204*c* and simulate how the input optical beam 204*c* appears in the far field. The filtered sample 320 of the input optical beam 204*c* is focused by a lens 324 onto a far field sensor 326, which can generate sensor measurements associated with the sample 320. For instance, the far field sensor 326 may generate power spectral density (PSD) measurements or other measurements associated with the sample 320, which can be used to determine whether the input optical beam 204*c* is positioned as desired in the far field and what the divergence of the input optical beam 204*c* is in the far field. The bulk of the input optical beam 204*c* that is not used as the sample 320 passes through a window 328, which can be optically transparent (at least with respect to the input optical beam 204*c*), and forms the TIL beam 108.

The measurements captured using the far field sensor 326 are provided to a command and control circuit card assembly (CCA) or other controller 330, which can use the measurements to determine how to adjust operation of the divergence controller 306 and/or the steering controller 312 in order to achieve desired changes to the TIL beam 108. For example, the controller 330 may adjust the position of one or both lenses 308, 310 in order to alter the divergence of the input optical beam 204*c*. In some embodiments, the divergence controller 306 may include one or more motors 332 that can be used to adjust the position(s) of one or both lenses 308, 310. The controller 330 may also or alternatively rotate one or both of the Risley wedges 314 or adjust the orientation of the steering mirror 316 in order to control the steering of the input optical beam 204*c*. In some embodiments, the steering controller 312 may include one or more motors 334 that can be used to rotate one or both of the Risley wedges 314 or to adjust the orientation of the steering mirror 316. The controller 330 may optionally receive input from or provide input to a separate auto-alignment sensing unit 336, which in some cases may represent the beam correction sensor 226, and use the auto-alignment input to control the divergence controller 306 and/or the steering controller 312. This allows the controller 330 to use a pointing reference (the measured position of the input optical beam 204*b*) to support additional independent control and calibration of the divergence controller 306 and/or the steering controller 312.

Effectively, the controller 330 and the far field sensor 326 for part of a closed control loop for controlling the divergence of the input optical beam 204*c* and part of a closed control loop for controlling the steering of the input optical beam 204*c*. The controller 330 includes any suitable structure configured to control the operation of the divergence controller 306 and the steering controller 312. In some embodiments, the controller 330 includes at least one microprocessor, microcontroller, digital signal processor (DSP), application-specific integrated circuit (ASIC), field programmable gate array (FPGA), or discrete circuitry. Note that while one controller 330 is shown here, the controller 330 may be divided into multiple controllers, such as when one controller is used to control the divergence controller 306 and another controller is used to control the steering controller 312.

As shown in FIG. 4, the sensing and correction unit 238 may optionally be expanded to support the use of a laser range-finder. In this example, a range-finding laser 402 in the sensing and correction unit 238 can be used to generate a range-finding beam 404. A range-finding beamsplitter 406 is used to generally align the range-finding beam 404 and the input optical beam 204*c*, such as by reflecting the range-finding beam 404 and transmitting the input optical beam 204*c* (although the opposite may also occur). The range-finding beam 404 can be transmitted towards a target 104 or other area, and a reflection of the range-finding beam 404 can be received and used to estimate the distance to the target 104 or other area. In this way, the range-finding beam 404 may be used along with the TIL beam 108, both of which can be transmitted via a common output aperture.

In this example, the beamsplitter 318 and the window 328 have been replaced by a window 408 having a single-surface fiducial pick-off. In these embodiments, the window 408 can be used to reflect the sample 320 of the input optical beam 204*c* towards the far field sensor 326. The window 408 may also be used to reflect a sample 410 of the range-finding beam 404 towards the far field sensor 326, as well as to allow the reflection of the range-finding beam 404 from the target 104 or other area to pass through the window 408 and be directed towards the far field sensor 326. The far field sensor 326 can generate sensor measurements associated with the range-finding beam 404 and provide the sensor measurements to the controller 330 for use in controlling the divergence controller 306 and the steering controller 312. Note that while not shown in FIG. 3, the window 408 having the single-surface fiducial pick-off may be used in FIG. 3 in place of the beamsplitter 318 and the window 328.

In some embodiments, the sensing and correction unit 238 shown in FIG. 3 and FIG. 4 may represent a single integrated module that can be calibrated and configured to provide beam divergence and steering control in real-time. The sensing and correction unit 238 can provide various benefits or advantages depending on the implementation, such as providing an actively-controlled TIL beam 108 or other beam (like for use during active target tracking) and dynamic parallax correction. Moreover, the sensing and correction unit 238 can provide closed-loop active steering control and closed-loop active divergence control. In addition, the sensing and correction unit 238 can be implemented in a very compact package, such as by using mirrors or other optical devices to route optical beams between the components of the sensing and correction unit 238 within a small space.

Although FIGS. 3 and 4 illustrate examples of devices supporting compact closed-loop bypass optical beam sensing and correction, various changes may be made to FIGS. 3 and 4. For example, components can be added, omitted, combined, further subdivided, replicated, or placed in any other suitable configuration in each of FIGS. 3 and 4 according to particular needs. As a specific example, various components in FIGS. 3 and 4 (such as the divergence controller 306 and the steering controller 312) are shown as being positioned collinearly, meaning the input optical beam 204*c* generally follows a straight path through the sensing and correction unit 238. However, mirrors or other optical devices may be used to redirect optical beams as needed or desired, such as to obtain a more compact package for the sensing and correction unit 238.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:

an optical device configured to spatially separate a first optical beam and a second optical beam;

a bypass optical beam sensing and correction unit configured to receive the second optical beam after the spatial separation, the bypass optical beam sensing and correction unit comprising:

a divergence controller configured to adjust a divergence of the second optical beam;

a steering controller configured to adjust a steering direction of the second optical beam;

a far field sensor configured to receive a sample of the second optical beam after adjustment of the divergence and the steering direction of the second optical beam and generate measurements of the sample; and at least one controller configured to control the divergence controller and the steering controller based on the measurements of the sample.

2. The apparatus of claim 1, wherein the divergence controller comprises:

a pair of lenses; and at least one motor configured to adjust a spacing between the lenses.

3. The apparatus of claim 1, wherein the steering controller comprises one of:

a pair of Risley wedges and at least one motor configured to rotate at least one of the Risley wedges; or at least one steering mirror.

4. The apparatus of claim 1, wherein the far field sensor and the at least one controller form part of a closed control loop for controlling the divergence of the second optical beam in real-time and part of a closed control loop for controlling the steering direction of the second optical beam in real-time.

5. The apparatus of claim 1, wherein the at least one controller is further configured to receive input from an auto-alignment sensor and to use the input from the auto-alignment sensor to control at least one of the divergence of the second optical beam and the steering direction of the second optical beam.

6. The apparatus of claim 1, further comprising:

a range-finding laser configured to generate a range-finding beam; and a beamsplitter configured to reflect one of the range-finding beam or the second optical beam in order to direct the range-finding beam and the second optical beam through a common aperture.

7. The apparatus of claim 1, wherein the optical device comprises a beamsplitter configured to reflect one of the first optical beam or the second optical beam and transmit another of the first optical beam or the second optical beam.

8. A system comprising:

multiple optical sources configured to generate multiple input optical beams, the multiple input optical beams including two or more optical beams and an additional optical beam;

a beam combiner configured to combine the two or more optical beams in order to generate a combined optical beam;

an optical device configured to spatially separate the combined optical beam and the additional optical beam;

a bypass optical beam sensing and correction unit configured to receive the additional optical beam after the spatial separation, the bypass optical beam sensing and correction unit comprising:

a divergence controller configured to adjust a divergence of the additional optical beam;

a steering controller configured to adjust a steering direction of the additional optical beam;

a far field sensor configured to receive a sample of the additional optical beam after adjustment of the divergence and the steering direction of the additional optical beam and generate measurements of the sample; and at least one controller configured to control the divergence controller and the steering controller based on the measurements of the sample.

9. The system of claim 8, wherein the divergence controller comprises:

a pair of lenses; and at least one motor configured to adjust a spacing between the lenses.

10. The system of claim 8, wherein the steering controller comprises one of:

a pair of Risley wedges and at least one motor configured to rotate at least one of the Risley wedges; or at least one steering mirror.

11. The system of claim 8, wherein the far field sensor and the at least one controller form part of a closed control loop for controlling the divergence of the additional optical beam in real-time and part of a closed control loop for controlling the steering direction of the additional optical beam in real-time.

12. The system of claim 8, wherein the at least one controller is further configured to receive input from an auto-alignment sensor and to use the input from the auto-alignment sensor to control at least one of the divergence of the additional optical beam and the steering direction of the additional optical beam.

13. The system of claim 8, further comprising:

a range-finding laser configured to generate a range-finding beam; and a beamsplitter configured to reflect one of the range-finding beam or the additional optical beam in order to direct the range-finding beam and the additional optical beam through a common aperture.

14. The system of claim 8, wherein the optical device comprises a beamsplitter configured to reflect one of the combined optical beam or the additional optical beam and transmit another of the combined optical beam or the additional optical beam.

15. The system of claim 8, further comprising:

one of a beamsplitter or a window configured to reflect the sample of the additional optical beam towards the far field sensor.

16. The system of claim 15, further comprising:

a neutral density filter configured to filter the sample of the additional optical beam; and a lens configured to focus the filtered sample of the additional optical beam onto the far field sensor.

17. The system of claim 8, further comprising:

one or more beam control elements configured to adjust the combined optical beam after the combined optical beam is spatially separated from the additional optical beam;

wherein the additional optical beam bypasses the one or more beam control elements.

18. A method comprising:

generating multiple input optical beams, the multiple input optical beams including two or more optical beams and an additional optical beam;

combining the two or more optical beams in order to generate a combined optical beam;

spatially separating the combined optical beam and the additional optical beam;

after spatially separating the combined optical beam and the additional optical beam, controlling a divergence of the additional optical beam;

after spatially separating the combined optical beam and the additional optical beam, controlling a steering direction of the additional optical beam;

receiving a sample of the additional optical beam after controlling of the divergence and the steering direction of the additional optical beam and generating measurements of the sample; and adjusting the controlling of the divergence and the controlling of the steering direction of the additional optical beam based on the measurements of the sample.

19. The method of claim 18, wherein the controlling of the divergence and the controlling of the steering direction of the additional optical beam are adjusted using closed control loops.

20. The method of claim 18, further comprising:

receiving input from an auto-alignment sensor; and using the input from the auto-alignment sensor to control at least one of the divergence of the additional optical beam and the steering direction of the additional optical beam.

* * * * *